US012795599B2

(12) United States Patent
Barbu et al.

(10) Patent No.: US 12,795,599 B2
(45) Date of Patent: Nov. 10, 2026

(54) REFERENCE SIGNALS

(71) Applicant: Nokia Technologies OY, Espoo (FI)

(72) Inventors: Oana-Elena Barbu, Aalborg (DK); Boyan Yanakiev, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 328 days.

(21) Appl. No.: 18/735,528

(22) Filed: Jun. 6, 2024

(65) Prior Publication Data

US 2024/0422732 A1 Dec. 19, 2024

(30) Foreign Application Priority Data

Jun. 13, 2023 (GB) ..................................... 2308792

(51) Int. Cl.
*H04W 64/00* (2009.01)
*H04L 5/00* (2006.01)
*H04W 92/18* (2009.01)

(52) U.S. Cl.
CPC ......... *H04W 64/006* (2013.01); *H04L 5/0051* (2013.01); *H04W 92/18* (2013.01)

(58) Field of Classification Search
CPC ........ H04L 5/0051; H04W 92/18; G01S 3/02; G01S 3/14; G01S 2205/01; G01S 5/0284; G01S 3/04
See application file for complete search history.

(56) References Cited

U.S. PATENT DOCUMENTS

| | | | | |
|---|---|---|---|---|
| 2018/0227703 | A1 | 8/2018 | Bitra et al. | |
| 2022/0046430 | A1 | 2/2022 | Liu et al. | |
| 2023/0366976 | A1* | 11/2023 | Manolakos | G01S 1/08 |
| 2024/0129884 | A1* | 4/2024 | Manolakos | G01S 5/0072 |

FOREIGN PATENT DOCUMENTS

| | | | |
|---|---|---|---|
| EP | 4163661 | A1 | 4/2023 |
| WO | 2022/192873 | A1 | 9/2022 |
| WO | 2022/212974 | A1 | 10/2022 |
| WO | 2022/220933 | A2 | 10/2022 |

OTHER PUBLICATIONS

"Potential solutions for SL Positioning" 3GPP TSG RAN WG1 #109-e, e-Meeting, May 9-20, 2022.

(Continued)

*Primary Examiner* — Charles N Appiah
*Assistant Examiner* — Frank E Donado
(74) *Attorney, Agent, or Firm* — Lippes Mathias LLP

(57) ABSTRACT

A method, apparatus and computer program is described comprising: receiving a downlink reference signal for each of a plurality of receiver angles of arrival of a first device, wherein the downlink reference signal is received at the first device from a network node at a first time; receiving a sidelink reference signal, wherein the sidelink reference signal is received at the first device from a second device at a second time; and determining a downlink angle of arrival at the second device based, at least in part, on: an estimated best angle, according to some metric, of the plurality of angles of arrival at the first device; and a position and orientation of the second device relative to the first device.

14 Claims, 9 Drawing Sheets

(56) References Cited

OTHER PUBLICATIONS

"Exploitation of Channel-Learning for Enhancing 5 Blind Beam Index Detection", Ji Yoon Han et al., Submission for IEEE ACccess.
Great British Combined Search and Examination Report for British Patent Application No. GB2308792.7 dated Dec. 6, 2023.
Great British Search Report for British Patent Application No. GB2308792.7 dated Dec. 6, 2023.
Search Report for European Application No. 24181511.7 dated Nov. 18, 2024.

* cited by examiner

REFERENCE SIGNALS

FIELD

The present specification relates to handling reference signals in mobile communication systems.

BACKGROUND

The present specification relates to the use of reference signals (such as positioning reference signals or channel state information) in systems having multiple devices in communication with one or more network nodes of a mobile communication system. The devices may have different capabilities.

SUMMARY

In a first aspect, this specification describes an apparatus comprising: means for receiving a downlink reference signal (e.g. a positioning reference signal or channel state information) for each of a plurality of angles of arrival of a first device (e.g. a first user device), wherein the downlink reference signal is received at the first device from a network node (e.g. a base station or a gNB or similar node) at a first time; means for receiving a sidelink reference signal, wherein the sidelink reference signal is received at the first device from a second device (e.g. a second user device) at a second time; and means for determining a downlink angle of arrival at the second device based, at least in part, on: an estimated best angle (e.g. the angle representing a strongest beam or having the shortest delay) for receiving the downlink reference signal, according to some metric, of the plurality of angles of arrival at the first device; and a position and orientation of the second device relative to the first device. The apparatus may be the first device. Alternatively, the apparatus could be implemented elsewhere (e.g. the apparatus may be a server, such as a server of a mobile communication system). The plurality of angles of arrival of the first device may be implemented by different receiver beams of the first device.

The estimated best angle may be an estimate of the best angle for positioning purposes (e.g. based on PRS signals). Alternatively, the estimated best angle may be an estimate of the best angle for data transfer purposes (e.g. based on CSI signals).

Some example embodiments further comprise means for estimating the best angle for receiving the downlink reference signal, according to said metric, of the plurality of angles of arrival at the first device.

Some example embodiments further comprise means for providing the determined downlink angle of arrival at the second device to said second device. Said downlink angle of arrival may be for communication between the second device and the network node.

Some example embodiments further comprise means for estimating the position and orientation of the second device relative to the first device based, at least in part, on the received sidelink reference signal.

Some example embodiments further comprise means for determining a geometry of a system comprising the first and second devices and said network node, wherein said geometry includes said downlink angle of arrival at the second device. The means for determining said geometry may comprise means for estimating a distance between the second device and the network node.

The sidelink reference signal may be received at some or all of the plurality of angles of arrival (e.g. receiver beams) of the first device. Thus, the sidelink signal could be received by a subset of the plurality of angles of arrival of the first device.

Some example embodiments further comprise means for determining whether a difference between the first and second times exceeds a threshold. In some example embodiments, the downlink angle of arrival at the second device is not provided to the second device in the event that the difference between the first and second times exceeds said threshold. Some example embodiments further comprise means for determining said threshold (e.g. based on Doppler shifts).

In some example embodiments, the downlink reference signal is collected as a vector of samples and/or the sidelink reference signal is collected as a vector of samples.

In a second aspect, this specification describes a second device (e.g. a second user device) comprising: means for transmitting a sidelink reference signal to a first device (e.g. a first user device); and means for receiving (from the first device) a downlink angle of arrival for use by the second device (e.g. for use for receiving signals from a network node), wherein the downlink angle of arrival for use by the second device is determined based, at least in part, on an estimated best angle, according to some metric (e.g. based on signal strength or signal delay), of a plurality of angles of arrival for receiving a downlink reference signal at the first device (e.g. receiver beams of the first device) and a position and orientation of the second device relative to the first device. A plurality of angles of arrival of the second device may be implemented by different receiver beams of the second device.

The estimated best angle at the first device may be an estimate of the best angle for positioning purposes (e.g. based on PRS signals). Alternatively, the estimated best angle may be an estimate of the best angle for data transfer purposes (e.g. based on CSI signals).

Some example embodiments further comprise means for estimating the position and orientation of the second device relative to the first device. This may be implemented at the first device based, at least in part, on the sidelink reference signal transmitted by the second device.

Some example embodiments further comprise means for determining a geometry of a system comprising the first and second devices and said network node, wherein said geometry includes said downlink angle of arrival at the second device. The means for determining said geometry may comprise means for estimating a distance between the second device and the network node.

Some example embodiments further comprise means for determining whether a difference between the first and second times exceeds a threshold. In some example embodiments, the downlink angle of arrival at the second device is not provided to the second device in the event that the difference between the first and second times exceeds said threshold. Some example embodiments further comprise means for determining said threshold (e.g. based on Doppler shifts).

In a third aspect, this specification describes a system comprising a first device (e.g. a first user device) and a second device (e.g. a second user device), wherein: the first device comprises: means for receiving a downlink reference signal for each of a plurality of receiver angles of arrival (e.g. receiver beams) of the first device, wherein the downlink reference signal is received at the first device from a network node at a first time; means for receiving a sidelink reference signal, wherein the sidelink reference signal is received at the first device from the second device at a second time; means for determining a downlink angle of arrival at the second device (for receiving signals from the network node) based, at least in part, on an estimated best angle for receiving the downlink reference signal, according to some metric, of the plurality of angles of arrival at the first device and a position and orientation of the second device relative to the first device; and means for providing the determined downlink angle of arrival at the second device to said second device; and the second device comprises: means for transmitting the sidelink reference signal to the first device; and means for receiving the determined downlink angle of arrival from the first device. The first device may include at least some of the features of the first aspect described above. The second may include at least some of the features of the second aspect described above.

In a fourth aspect, this specification describes a method comprising: receiving a downlink reference signal for each of a plurality of receiver angles of arrival of a first device (e.g. a first user device), wherein the downlink reference signal is received at the first device from a network node (e.g. a base station, gNB or similar device) at a first time; receiving a sidelink reference signal, wherein the sidelink reference signal is received at the first device from a second device (e.g. a second user device) at a second time; and determining a downlink angle of arrival at the second device (e.g. for receiving signals at the second device from the network node) based, at least in part, on: an estimated best angle for receiving the downlink reference signal, according to some metric, of the plurality of angles of arrival at the first device; and a position and orientation of the second device relative to the first device. The method may be implemented at the first device. Alternatively, the method could be implemented elsewhere (e.g. at a server). The plurality of angles of arrival of the first device may be implemented by different receiver beams of the first device.

The estimated best angle may be an estimate of the best angle for positioning purposes (e.g. based on PRS signals). Alternatively, the estimated best angle may be an estimate of the best angle for data transfer purposes (e.g. based on CSI signals).

Some example embodiments further comprise estimating the best angle for receiving the downlink reference signal, according to said metric, of the plurality of angles of arrival at the first device.

Some example embodiments further comprise providing the determined downlink angle of arrival at the second device to said second device.

Some example embodiments further comprise estimating the position and orientation of the second device relative to the first device based, at least in part, on the received sidelink reference signal.

Some example embodiments further comprise determining a geometry of a system comprising the first and second devices and said network node, wherein said geometry includes said downlink angle of arrival at the second device. Determining said geometry may comprise estimating a distance between the second device and the network node.

The sidelink reference signal may be received at some or all of the plurality of angles of arrival of the first device. Thus, the sidelink signal could be received by a subset of the plurality of angles of arrival of the first device.

Some example embodiments further comprise determining whether a difference between the first and second times exceeds a threshold. In some example embodiments, the downlink angle of arrival at the second device is not provided to the second device in the event that the difference between the first and second times exceeds said threshold. Some example embodiments further comprise determining said threshold (e.g. based on Doppler shifts).

In some example embodiments, the downlink reference signal is collected as a vector of samples and/or the sidelink reference signal is collected as a vector of samples.

In a fifth aspect, this specification describes a method (implemented at a second device) comprising: transmitting a sidelink reference signal to a first device (e.g. a first user device); and receiving (from the first device) a downlink angle of arrival for use by the second device (e.g. for use for receiving signals at the second device from a network node), wherein the downlink angle of arrival for use by the second device is determined based, at least in part, on an estimated best angle, according to some metric (e.g. based on signal strength or signal delay), of a plurality of angles of arrival for receiving a downlink reference signal at the first device and a position and orientation of the second device relative to the first device. A plurality of angles of arrival of the second device may be implemented by different receiver beams of the second device.

The estimated best angle at the first device may be an estimate of the best angle for positioning purposes (e.g. based on PRS signals). Alternatively, the estimated best angle may be an estimate of the best angle for data transfer purposes (e.g. based on CSI signals).

Some example embodiments further comprise estimating the position and orientation of the second device relative to the first device. This may be implemented at the first device based, at least in part, on the sidelink reference signal transmitted by the second device.

Some example embodiments further comprise determining a geometry of a system comprising the first and second devices and said network node, wherein said geometry includes said downlink angle of arrival at the second device.

Some example embodiments further comprise determining whether a difference between the first and second times exceeds a threshold. In some example embodiments, the downlink angle of arrival at the second device is not provided to the second device in the event that the difference between the first and second times exceeds said threshold. Some example embodiments further comprise determining said threshold (e.g. based on Doppler shifts).

In a sixth aspect, describes a method receiving, at a first device, a downlink reference signal for each of a plurality of receiver angles of arrival (e.g. receiver beams) of the first device, wherein the downlink reference signal is received at the first device from a network node at a first time; transmitting a sidelink reference signal from the second device to the first device; receiving the sidelink reference signal at the first device, wherein the sidelink reference signal is received at the first device from the second device at a second time; determining (e.g. at the first device, or at a server) a downlink angle of arrival at the second device based, at least in part, on an estimated best angle for receiving the downlink reference signal, according to some metric, of the plurality of angles of arrival at the first device and a position and orientation of the second device relative to the first device; providing the determined downlink angle of arrival at the second device to said second device; and receiving the determined downlink angle of arrival at the second device from the first device. The first device may include at least some of the features of the first aspect described above. The second may include at least some of the features of the second aspect described above.

In a seventh aspect, this specification describes computer-readable instructions which, when executed by a computing apparatus, cause the computing apparatus to perform (at least) any method as described herein (including the methods of the fourth to sixth aspects described above).

In an eighth aspect, this specification describes a computer-readable medium (such as a non-transitory computer-readable medium) comprising program instructions stored thereon for performing (at least) any method as described herein (including the methods of the fourth to sixth aspects described above).

In a ninth aspect, this specification describes an apparatus comprising: at least one processor; and at least one memory including computer program code which, when executed by the at least one processor, causes the apparatus to perform (at least) any method as described herein (including the method of the second aspect described above).

In a tenth aspect, this specification describes an apparatus comprising: at least one processor; and at least one memory storing instructions that, when executed by the at least one processor, causes the apparatus to perform (at least) any method as described herein (including the method of the second aspect described above).

In an eleventh aspect, this specification describes a computer program comprising instructions which, when executed by an apparatus, cause the apparatus to: receive a downlink reference signal for each of a plurality of receiver angles of arrival of a first device (e.g. a first user device), wherein the downlink reference signal is received at the first device from a network node (e.g. a base station, gNB or similar device) at a first time; receive a sidelink reference signal, wherein the sidelink reference signal is received at the first device from a second device (e.g. a second user device) at a second time; and determine a downlink angle of arrival at the second device (e.g. for receiving signals at the second device from the network node) based, at least in part, on: an estimated best angle for receiving the downlink reference signal, according to some metric, of the plurality of angles of arrival at the first device; and a position and orientation of the second device relative to the first device.

In a twelfth aspect, this specification describes a computer program comprising instructions which, when executed by an apparatus, cause the apparatus to: transmit a sidelink reference signal to a first device (e.g. a first user device); and receive (from the first device) a downlink angle of arrival for use by the second device (e.g. for use for receiving signals from a network node), wherein the downlink angle of arrival for use by the second device is determined based, at least in part, on an estimated best angle, according to some metric (e.g. based on signal strength or signal delay), of a plurality of angles of arrival for receiving a downlink reference signal at the first device and a position and orientation of the second device relative to the first device.

In a thirteenth aspect, this specification describes a computer program comprising instructions which, when executed by an apparatus, cause the apparatus to: receive, at a first device, a downlink reference signal for each of a plurality of receiver angles of arrival (e.g. receiver beams) of the first device, wherein the downlink reference signal is received at the first device from a network node at a first time; transmit a sidelink reference signal from the second device to the first device; receive the sidelink reference signal at the first device, wherein the sidelink reference signal is received at the first device from the second device at a second time; determine (e.g. at the first device, or at a server) a downlink angle of arrival at the second device based, at least in part, on an estimated best angle for receiving the downlink reference signal, according to some metric, of the plurality of angles of arrival at the first device and a position and orientation of the second device relative to the first device; provide the determined downlink angle of arrival at the second device to said second device; and receive the determined downlink angle of arrival at the second device from the first device.

In a fourteenth aspect, this specification describes an apparatus comprising: first receiver beams (or some other means) for receiving a downlink reference signal for each of a plurality of receiver angles of arrival of a first device (e.g. a first user device), wherein the downlink reference signal is received at the first device from a network node (e.g. a base station, gNB or similar device) at a first time; second receiver beams (or some other means) for receiving a sidelink reference signal, wherein the sidelink reference signal is received at the first device from a second device (e.g. a second user device) at a second time; and a processor (or some other means) for determining a downlink angle of arrival at the second device (e.g. for communications between the second device and the network node) based, at least in part, on: an estimated best angle for receiving the downlink reference signal, according to some metric, of the plurality of angles of arrival at the first device; and a position and orientation of the second device relative to the first device. The first and second receiver beams may be at least partially overlapping.

In a fifteenth aspect, this specification describes an apparatus comprising: a transmitter (or some other means) for transmitting a sidelink reference signal to a first device (e.g. a first user device); and one or more receiver beams (or some other means) for receiving (from the first device) a downlink angle of arrival for use by the second device (e.g. for use for receiving signals from a network node), wherein the downlink angle of arrival for use by the second device is determined based, at least in part, on an estimated best angle, according to some metric (e.g. based on signal strength or signal delay), of a plurality of angles of arrival for receiving a downlink reference signal at the first device and a position and orientation of the second device relative to the first device.

In a sixteenth aspect, this specification describes a system comprising the apparatus of fourteenth aspect and the apparatus of the fifteenth aspect.

BRIEF DESCRIPTION OF THE DRAWINGS

Example embodiments will now be described, by way of non-limiting examples, with reference to the following schematic drawings, in which.

DETAILED DESCRIPTION

Figure 1:
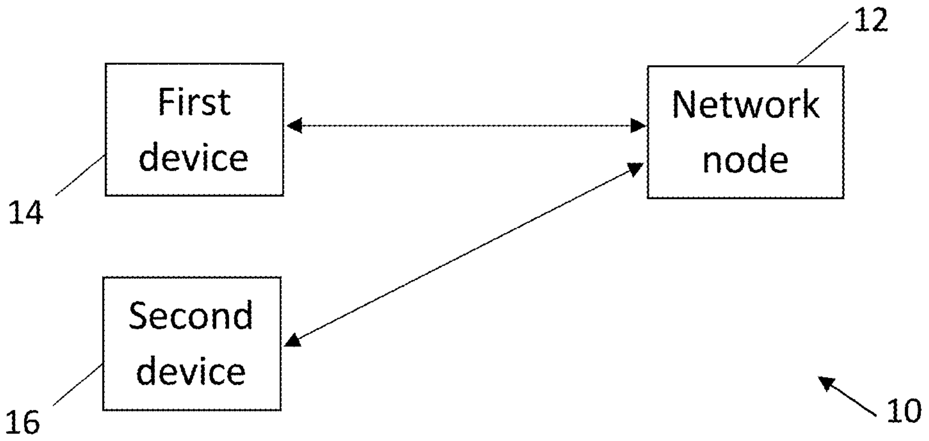
FIGS. 1 to 4 are block diagram of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a network node 12, a first device 14 and a second device 16. The first and second user devices are each in two-way communication with the network node 12.

The network node 12 may be a network node of a mobile communication system (e.g. a base station). The first and second devices may be radio devices (e.g. user devices or user equipment) that form part of the mobile communication system.

As discussed in detail, the first and second devices 14 and 16 may receive downlink reference signals from the network node 12. The downlink reference signals may be provided for a variety of purposes. Example downlink reference signals include positioning reference signals (PRS) used for positioning or channel state information (CSI) used for maximising data transfer and for calibrating the link between the network node and the respective user device to the experienced channel conditions. The skilled person will be aware of other reference signals that could be relevant to example embodiments.

The system 10 could take many forms and could be used in many applications. Example applications that are discussed below are Industrial Internet of Things (IIoT) and extended reality (XR) applications. The skilled person will, however, be aware of many alternative applications that could make use of the principles discussed herein. Similarly, the network node and the devices discussed herein may form part of a New Radio (NR) communication system, but the principles described herein are widely applicable to other communications systems.

Figure 2:
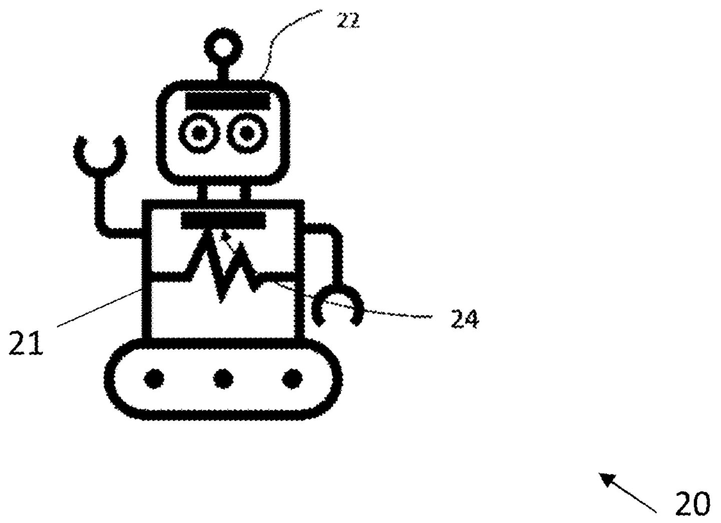

FIG. 2 is a block diagram of a system, indicated generally by the reference numeral 20, in accordance with an example embodiment. The system 20 comprising a robot 21 (or some other industrial equipment). The robot 21 includes a first device 22 and a second device 24. The first and second devices may be radio devices and may be examples of the first and second devices 14 and 16 of the system 10 described above. The devices 22 and 24 may each be in communication with a network node (such as the network node 12 described above) and may be in communication with each other.

By way of example, the second device 24 (e.g. an IoT device) may have limited power and/or intelligence (e.g. processing ability) when compared with the first device 22. In some scenarios (e.g. some New Radio (NR) applications), the first and second devices 22 and 24 may both be required to comply with all NR requirement (e.g. in in terms of accuracy and latency of the various NR operations such as beam selection, positioning, etc.), regardless of the capabilities of the respective devices.

Figure 3:
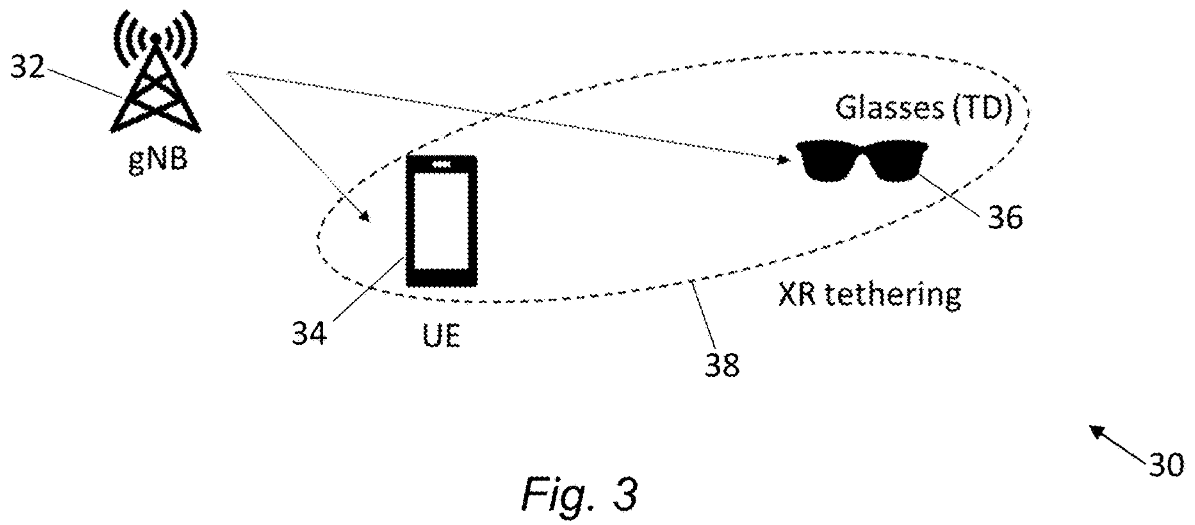

FIG. 3 is a block diagram of a system, indicated generally by the reference numeral 30, in accordance with an example embodiment. The system 30 comprising a base station 32, a user equipment (UE) 34 and a tethered device 36 (smart glasses in the example shown). The UE 34 is paired with the tethered device 36 (as indicated by the dotted grouping 38), such that the UE 34 and the tethered device 36 are able to communicate with each other. Both the UE 34 and the tethered device 36 include a NR radio (or similar communication means) and are in two-way communication with the base station 32. Thus, the base station may be an example of the network node 12 and the UE 34 and tethered device 36 may be examples of the first and second devices 14 and 16 discussed above.

In one use case, the tethered device 36 may be provided as an end consumer of some or all XR related traffic (such as video/audio streaming, NR positioning, etc) in the system 30. However, the tethered device 36 is typically more limited in some respects that the UE 34 (e.g. having relatively limited battery life or processing ability). Prior to performing data/positioning operations, the tethered device may be required to perform several demanding (e.g. power-consuming) tasks such as synchronization to the gNB, RX beam selection etc.

For example, to achieve centimetre-range positioning accuracy, each NR radio (such as the devices 22 and 24 in the system 20 and the UE 34 and tethered device 36 in the system 30) may be required to:

- measure downlink positioning reference signal (DL PRS) with all receive beams of the respective device;
- estimate the best DL receive beam;
- extract positioning measurements such as time and/or angle data on the best beam; and
- Report measurements and/or compute its own location using measurements obtained in the steps above.

Such requirements may be onerous in terms of battery life and/or processing capabilities for some devices.

Figure 4:
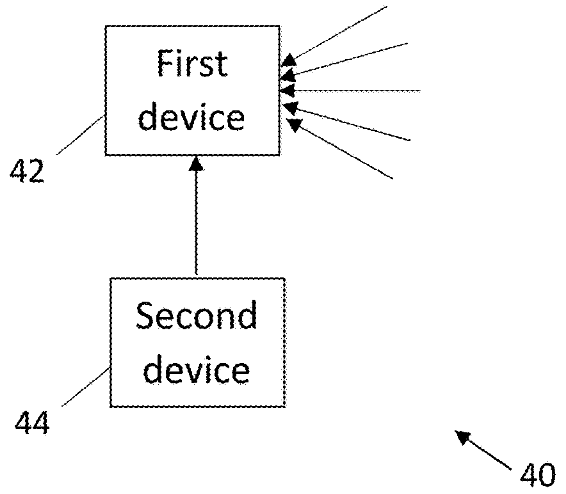

FIG. 4 is a block diagram of a system, indicated generally by the reference numeral 40, in accordance with an example embodiment. The system 40 comprises a first device 42 (e.g. a first user device) and a second device 44 (e.g. a second user device). The first device 42 may be used as the first device 22 or the UE 34 of the systems 20 and 30 described above. Similarly, the second device 44 may be used as the second device 24 or the tethered device 36 of the systems 20 and 30.

The first device 42 receives a downlink reference signal (such as a positioning reference signal or some other reference signal) for each of a plurality of receiver angles of arrival of the first device (as indicated by the multiple arrows shown in FIG. 4). The various angles of arrival may be referred to as receiver beams of the first device. The downlink reference signal is received at the first device 42 from a network node (such as the network node 12, the base station 32 or a gNB). The second device 44 transmits a sidelink reference signal to the first device (as indicated by the arrow in FIG. 4).

As discussed in detail below, the first device 42 is used to determine a downlink angle of arrival at the second device 44 and to provides the determined downlink angle of arrival at the second device to said second device.

Figure 5:
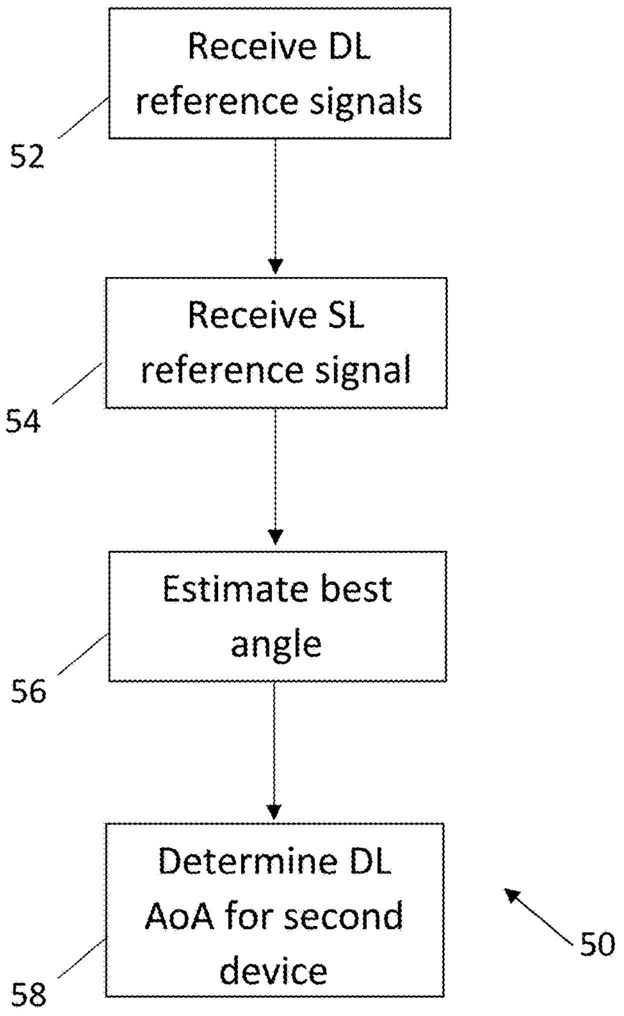
FIG. 5 is a flowchart of an algorithm in accordance with an example embodiment.

FIG. 5 is a flowchart of an algorithm, indicated generally by the reference numeral 50, in accordance with an example embodiment. The algorithm 50 may be implemented using the system 40 described above. Note that the algorithm 50 may be implemented at the first device 42 of the system 40, but this is not essential to all example embodiments; for example, the algorithm 50 could be implemented elsewhere (e.g. at a server).

The algorithm 50 starts at operation 52 where a downlink reference signal for each of a plurality of receiver angles of arrival of a first device is received (at the first device 42) from a network node (such as the network node 12 or the base station 32). The downlink reference signal is received at a first time ($t_1$). The operation 52 may be implemented by different receiver beams of the first device (having different angles of arrival). From these, the "best" angle of arrival can be determined according to some metric (e.g. the strongest beam or the beam with the shortest delay), as discussed further below. Note that the definition of "best" may dependent on the circumstances (e.g. the signal with the higher power or the shortest delay might be selected in some embodiments).

At operation 54, a sidelink reference signal is received at the first device 42 from the second device 44. The sidelink reference signal is received at a second time ($t_2$).

Note that in the algorithm 50 (and in other algorithms described herein), the downlink reference signals and/or the sidelink reference signals may be collected as vectors of samples.

At operation 56, a best angle, according to some metric, of the plurality of angles of arrival at the first device 42 is estimated or determined.

At operation 58, a downlink angle of arrival for signals received at the second device 44 from the network node (such as the network node 12 or the base station 32) is determined. This angle may be based, at least in part, on the output of the operation 56 and a position and orientation of the second device relative to the first device. The determined downlink angle of arrival at the second device may be provided (by the first device) to said second device. The second device 44 can then use the determined downlink angle of arrival for receiving downlink signals from the network node.

In one example embodiment, the "best" angle is selected for positioning purposes (e.g. based on positioning reference signals). In another example embodiment, the "best" angle is the best angle for data transfer purposes (e.g. based on CSI signals). The skilled person will be aware of other reference signals that could be used in accordance with the principles discussed herein.

The operation 56 may be omitted in some example embodiments. For example, in some example embodiments, the operation 58 may not require a best angle of the plurality of angles of arrival at the first device to be determined (as discussed further below).

Figure 6:
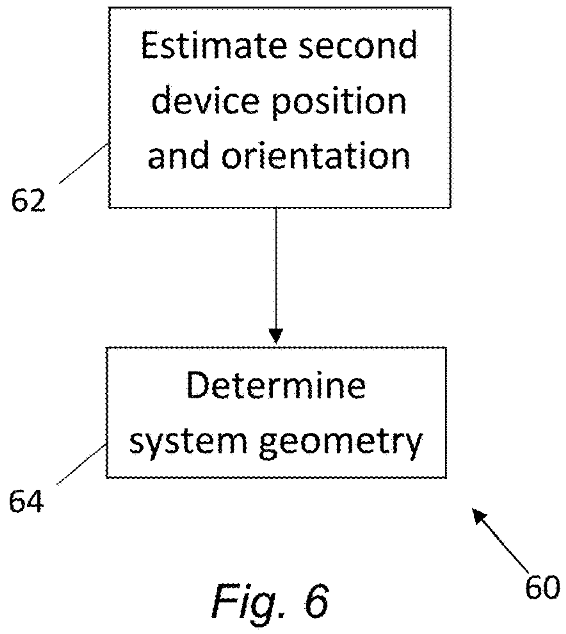
FIG. 6 is a flowchart of an algorithm in accordance with an example embodiment.

FIG. 6 is a flowchart of an algorithm, indicated generally by the reference numeral 60, in accordance with an example embodiment.

The algorithm 60 starts at operation 62 where the position and orientation of the second device 44 relative to the first device 42 is estimated based, at least in part, on the sidelink reference signal received (at the first device 42) from the second device 44.

At operation 64, a geometry of a system comprising the first and second devices and a network node is determined. As discussed further below, this may include estimating a distance between the second device and the network node. The geometry may include the downlink angle of arrival at the second device 44. Thus, the operation 64 may be used to implement the operation 58 of the algorithm 50 described above.

Figure 7:
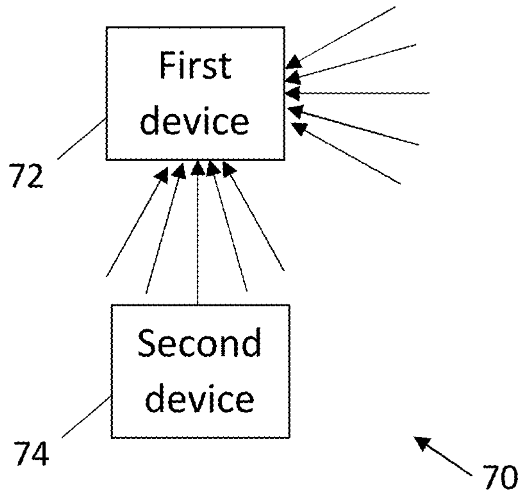
FIG. 7 is a block diagram of a system in accordance with an example embodiment.

FIG. 7 is a block diagram of a system, indicated generally by the reference numeral 70, in accordance with an example embodiment. The system 70 comprises a first device 72 (which may be similar to the first device 42 described above) and a second device 74 (which may be similar to the second device 44 described above).

In addition to receiving a downlink reference signal for each of a plurality of receiver angles of arrival of a first device is received (as discussed above with reference to the operation 52), the first device 72 receives a sidelink reference signal from the second device 74 at some or all of the plurality of angles of arrival of the first device. For example, the sidelink signal could be received by a subset of beams of the first device that are used to receive the downlink reference signal (or, indeed, at a different or overlapping set of beams of the first device). An angle of arrival for signals from the second device 74 can be selected in a similar manner to the selection of an angle of arrival for signals from the network node, as discussed above.

Figure 8:
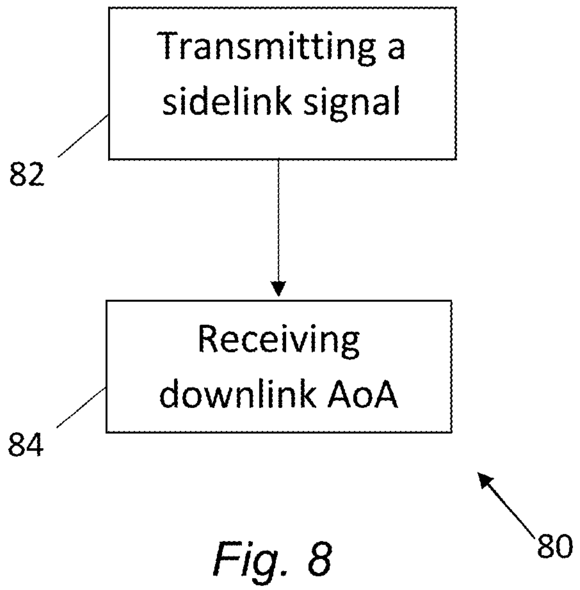
FIG. 8 is a flowchart of an algorithm in accordance with an example embodiment.

FIG. 8 is a flowchart of an algorithm, indicated generally by the reference numeral 80, in accordance with an example embodiment. The algorithm 80 may be implemented at the second device 44 of the system 40, the second device 74 of the system 70 or some other apparatus (e.g. under the control of a server).

The algorithm 80 starts at operation 82 where a sidelink reference signal is transmitted to a first device (e.g. the first device 42 of the system 40 or the first device 72 of the system 70).

At operation 84, a downlink angle of arrival is received from the first device. The downlink angle of arrival is for use by the second device. As discussed above, the downlink angle of arrival may be determined (e.g. at the first user device, or elsewhere, such as at a server) based, at least in part, on an estimated best angle, according to some metric, of a plurality of angles of arrival at the first device and a position and orientation of the second device relative to the first device.

Figure 9:
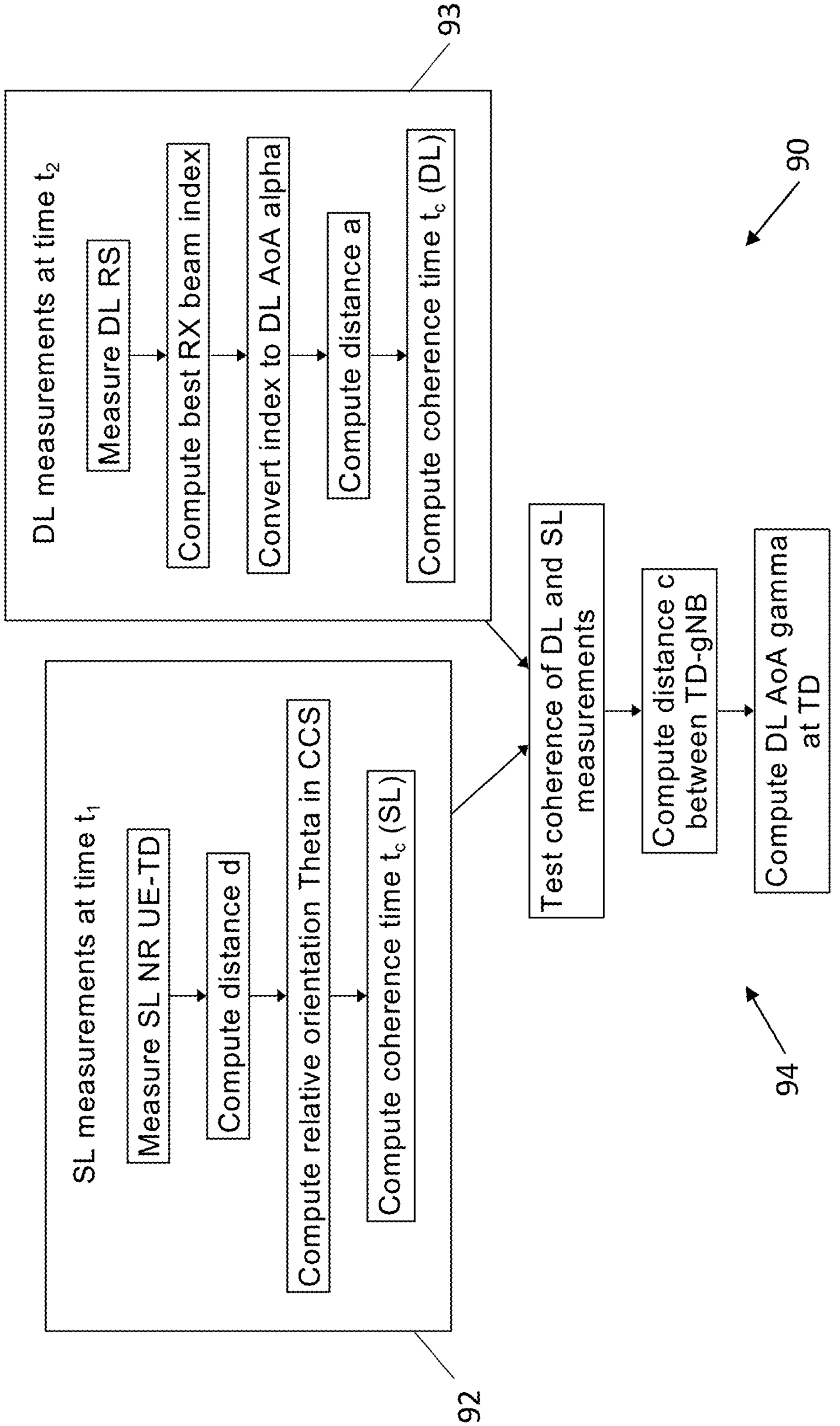
FIG. 9 is a flowchart of an algorithm in accordance with an example embodiment.

FIG. 9 is a flowchart of an algorithm, indicated generally by the reference numeral 90, in accordance with an example embodiment. The algorithm 90 gives further details of some aspects of the algorithms 50, 60 and 80 described above.

For example, the algorithm 90 is applicable to a system in which a low-capability device (e.g. an IoT or XR tethered device) is grouped/tethered with a high-capability NR UE. The algorithm 90 may be implemented, for example, by any of the systems 10 to 40 or 70 described above, or some similar system. The algorithm 90 includes steps 92, 93 and 94, which are discussed further below.

At time $t_1$, the first and second device of the system (e.g. a UE and a tethered device) use a common coordinate system (CCS) that might be a common Local Coordinate System (LCS) or a Global Coordinate System (GCS). Due to the grouped nature of the setup, the first and second device may know (or may have obtained) information about the distance "d" to each other and know their relative orientation "θ" (i.e. relating to the geometry of the system—see FIGS. 10 and 11 discussed below).

If the geometry information is not available, the first device may initiate a sidelink positioning procedure through which they obtain ranging information, agree on a CCS, and compute their relative orientation. These are the steps 92 of the algorithm 90 shown in FIG. 9.

At time $t_2$, the first device measures a DL reference signal of a network node and computes a best downlink angle of arrival (AoA) according to some metric. This step may, for example, be implemented by having the first device sweep through all its receive beams, measure the received power per beam and select the beam that collects the most power. The conversion from receive beam index to DL AoA α follows hereafter straightforwardly. These are the steps 93 of the algorithm 90 shown in FIG. 9.

Note that during the steps 93 (or as part of the most recent synchronization procedure), the first device may learn an approximate distance a to the respective network node (such as a gNB). (Again, see FIGS. 10 and 11 discussed below showing parameters of the steps 93.)

With the system geometry known (e.g. by implementing the steps 92) and the downlink reference signals received and processed (e.g. in accordance with the steps 93), the algorithm 90 proceeds to the steps 94.

The first device computes the time difference between the time $t_1$ of the latest measurements of (θ,d) and time $t_2$ of the latest measurements of (α,a). If this is less than a minimum defined time, which may be a coherence time of DL and SL channels (e.g. if $|t1-t2|<\min(t_c(DL),t_c(SL))$, where $$t_c(DL) \sim \frac{1}{4f_D(DL)},\ t_c(SL) \sim \frac{1}{4f_D(SL)},$$

and $f_D(DL)$ and $f_D(SL)$ are the maximum Doppler shifts for the DL and SL respectively), then the first device concludes that the two measurements are coherent and proceeds with the next step. If the two measurements are not considered to be coherent (i.e. not sufficiently coherent), then the algorithm 90 may terminate at this stage. (It should be noted that the times $t_1$ and $t_2$ could be the same so that the time difference is zero.)

Having estimated the distances between the first device and the network node (e.g. UE-gNB), between the first and second device (e.g. UE-TD), the downlink angle of arrival at the first device (DL AoA), and the relative orientation between the first and second devices, the first device approximates the distance from the second device to the network node (TD device-gNB). For example, the distance may be computed as $$c \approx \sqrt{a^2 + d^2 - 2ad\cos(\alpha-\theta)}.$$

Having computed the distance TD-gNB and TD-UE, the first device can approximate the AoA for the second device (i.e. the AoA of the signal from the gNB as received at the second device) as e.g., $\gamma \approx \pi - \beta + \theta$, $$\beta \approx \arccos\frac{(a^2 - (d^2 + c^2))}{2dc}.$$

Alternatively, the final two steps above may be combined, and the first device may directly estimate the AoA for the second device using the distances UE-gNB, UE-TD, DL AoA, and the relative orientation as:

$$\gamma \approx \pi - \arccos\frac{d(a\cos(\alpha-\theta) - d)}{\sqrt{a^2 + d^2 - 2ad\cos(\alpha-\theta)}} + \theta.$$

Note that depending on the chosen reference coordinate system the signs in the equation above might change.

On completion of the algorithm 90, the determined downlink angle of arrival at the second device may be provided to said second device. Note, however, that the steps 94 may be used to determine whether a difference between the first and second times ($t_1$ and $t_2$) exceeds a threshold and the downlink angle of arrival at the second device may not be provided to the second device in the event that the difference between the first and second times exceeds said threshold. An example algorithm for determining said threshold (e.g. based on Doppler shifts) is discussed herein.

Figure 10:
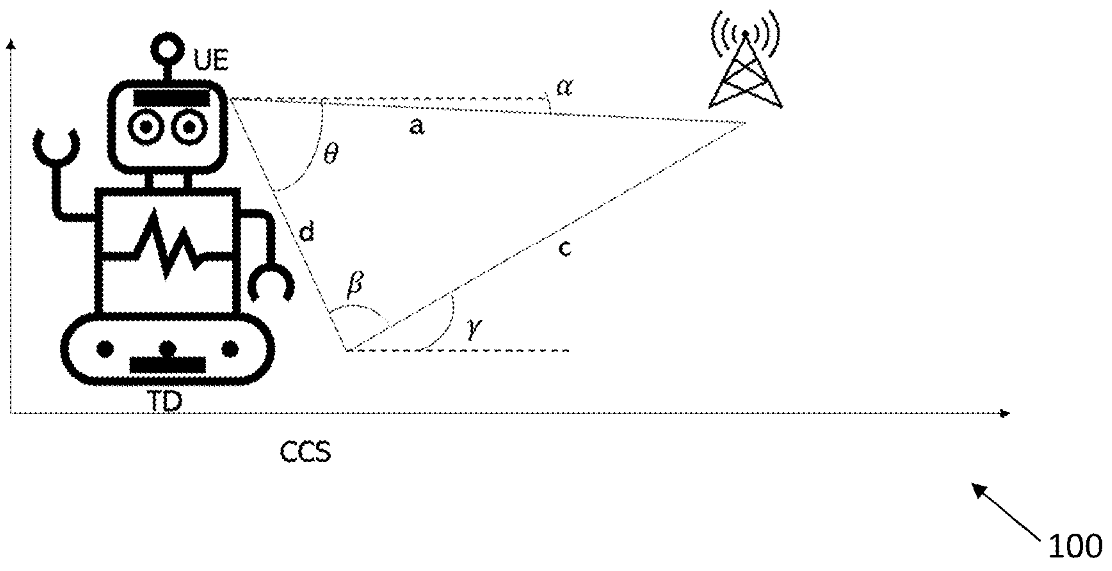
FIG. 10 is a plot demonstrating an aspect of an example embodiment.

FIG. 10 is a plot, indicated generally by the reference numeral 100, demonstrating an aspect of an example embodiment. The plot 100 shows the robot 21 of the system 20 described above, including the first device 22 (labelled UE in FIG. 10), the second device 24 (labelled TD in FIG. 10) and a base station that is in communication with the first and second devices. As discussed above, the second device (TD) may have limited power and/or intelligence (e.g. processing ability) when compared with the first device (UE).

Figure 11:
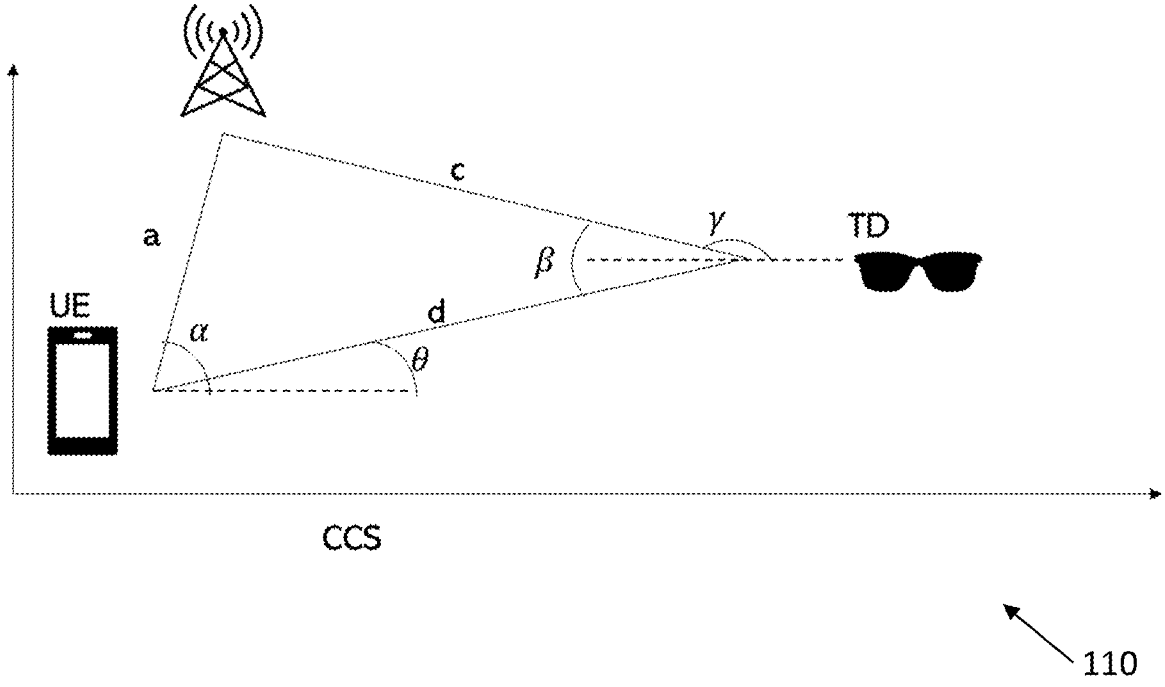
FIG. 11 is a plot demonstrating an aspect of an example embodiment.

FIG. 11 is a plot, indicated generally by the reference numeral 110, demonstrating an aspect of an example embodiment. The plot **11*o* shows the system 30 described above, including the base station 32, the user equipment 34 and the tethered device 36**.

The plots 110 and 120 show various distances and angles referred to in the algorithm 90 discussed above.

Figure 12:
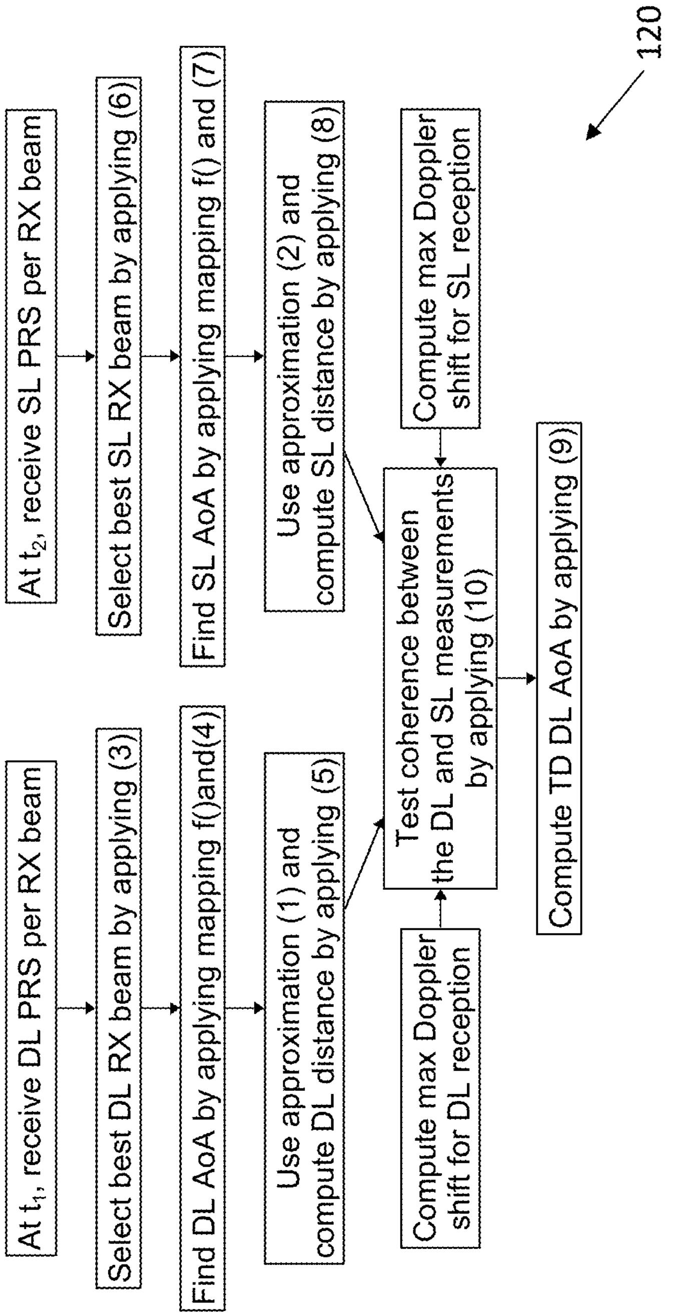
FIG. 12 is a flowchart of an algorithm in accordance with an example embodiment.

FIG. 12 is a flowchart of an algorithm, indicated generally by the reference numeral 120, in accordance with an example embodiment. The algorithm 120 may be implemented using the system 20 or 30 and is described below with reference to the plots 100 and 110.

The algorithm 120 can be used to determine determining a geometry of a system (such as the systems 20 and 30) comprising the first and second devices and said network node, wherein said geometry includes said downlink angle of arrival at the second device.

Assume that the respective UE receives a DL reference signal (DL RS) at time $t_1$ and a sidelink positioning reference signal (SL PRS) at time $t_2$ and is tasked to compute the TD device DL AoA γ, where we approximate the TD DL AoA as:

$$\gamma \approx const - \arccos\frac{d(a\cos(\alpha-\theta) - d)}{\sqrt{a^2 + d^2 - 2ad\cos(\alpha-\theta)}} \tag{0}$$

Where const may be equal to π+θ.

The DL RS N samples in each RX beam (j) of the UE, j=1:J are collected in vector $$y^{(j)} = [y_1^{(j)}, \ldots\ y_N^{(j)}],$$

where we approximate the n-th sample as:

$$y_n^{(j)} \approx h_a^{(j)} s\left(nT_s - \frac{a}{c_0}\right), \tag{1}$$

where s(t) is the TX DL RS, $$h_a^{(j)}$$

is the DL channel attenuation coefficient in RX beam (j), $c_0$ is the speed of light in vacuum and Ts is the sampling time of the system. The SL PRS samples received by the UE in each beam (l) are collected in vector $$z^{(l)} = \left[z_1^{(l)}, \ldots, z_K^{(l)}\right]$$

where we approximate the k-th sample as $$z_k^{(l)} \approx h_d^{(l)} u\left(kT_s - \frac{d}{c_0}\right) \tag{2}$$

where u(t) is the TX SL PRS, $$h_d^{(l)}$$

is the SL channel attenuation coefficient in beam (1). Thus, to compute the TD DL AOA in (o), the UE needs to first estimate distances a, d and angles α, θ. To that end, we propose a method through which the UE uses the samples (1) to estimate the distance a and DL AoA α and samples (2) to estimate distance d and SL AoA θ.

First, a downlink (DL) distance a and DL AoA α are estimated.

Note there is a unique known mapping between a receive beam index and an AoA i.e. AoA=f(RX beam index), where f is known. Therefore, the UE estimates DL RS AoA $\hat{\alpha}$ as that corresponding to the RX beam j that collects the highest power DL RS samples. In other words, the UE applies the following operations:

Compute the RX beam index that collects the most signal energy:

$$\hat{J} = \arg\max_j\left\{\left\|y^{(j)}\right\|^2,\ j = 1{:}\ J\right\} \tag{3}$$

Apply the mapping f( ) to find the AoA:

$$\hat{\alpha} = f(\hat{J}) \tag{4}$$

Next, the UE estimates the distance a by e.g. solving $$\hat{\alpha}, h_a^{(\hat{J})} = \arg\min\left\|y^{(\hat{J})} - h_a^{(\hat{J})} s_a\right\|^2 \tag{5}$$

where $s_\alpha=[s_\alpha(1), \ldots, s_\alpha(N)]$ and $$s_a(n) = s\left(nT_s - \frac{a}{c_0}\right).$$

Solving (5) may be done with any available numerical solver.

Second, distance d and AoA θ are estimated. The UE estimates the AOA $\hat{\theta}$ as that corresponding to the RX beam 1 that collects the highest power SL PRS samples i.e.:

$$\hat{l} = \arg\max_l\left\{\left\|z^{(l)}\right\|^2,\ l = 1{:}\ J\right\} \tag{6}$$

$$\hat{\theta} = f(\hat{l}) \tag{7}$$

The UE computes the distance d by e.g. solving $$\hat{d}, h_d^{(\hat{l})} = \arg\min\left\|z^{(\hat{l})} - h_d^{(\hat{l})} u_d\right\|^2 \tag{8}$$

where $u_d=[u_d(1), \ldots, u_d(K)]$ and $$u_d(k) = \left(kT_s - \frac{d}{c_0}\right).$$

Third, the tethered device TD DL AoA γ is estimated. Inserting the results (4, 5) and (7, 8) into (0), the angle $\hat{\gamma}$ is computed as:

$$\hat{\gamma} \approx \pi - \arccos\frac{\hat{d}\left(\hat{a}\cos\left(\hat{\alpha} - \hat{\theta}\right) - \hat{d}\right)}{\sqrt{\hat{a}^2 + \hat{d}^2 - 2\hat{a}\hat{d}\cos(\hat{\alpha} - \hat{\theta})}} + \hat{\theta} \tag{9}$$

Note that the update (9) is conditioned on the measurement coherence test discussed above (e.g., that the UE location has not changed relative to either gNB or TD between the reception of the DL $t_1$ and of the SL $t_2$). This may be checked by comparing the difference |t2−t1| with the minimum coherence time of each of the DL and SL channels respectively e.g.: Apply (9) only when $$|t1 - t2| < \min t_c(DL), t_c(SL)) \tag{10}$$

Where $$t_c(DL) \sim \frac{1}{4 f_D(DL)},\ t_c(SL) \sim \frac{1}{4 f_D(SL)},$$

and $f_D$(DL) and $F_D$(SL) are the maximum Doppler shifts for the DL and respectively SL.

Figure 13:
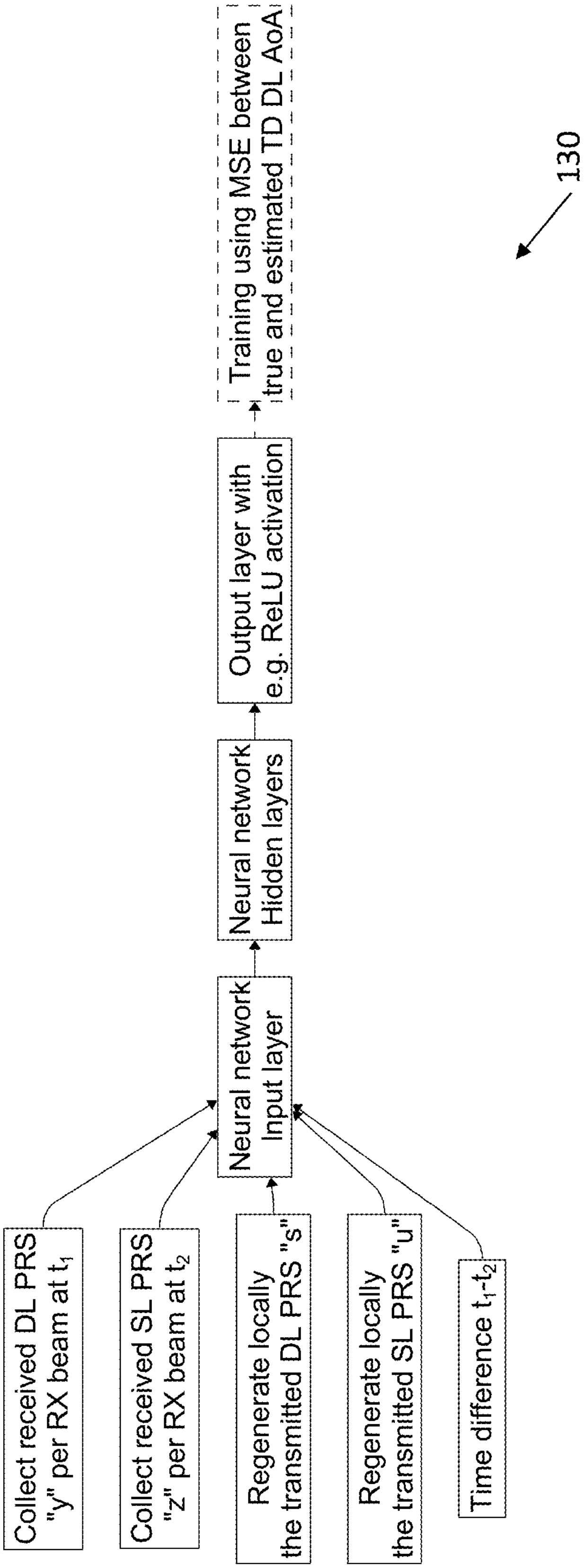
FIG. 13 is a flowchart of an algorithm in accordance with an example embodiment.

FIG. 13 is a flowchart of an algorithm, indicated generally by the reference numeral 130, in accordance with an example embodiment. The algorithm 130 provides an alternative embodiment in which a neural network (e.g. DNN, CNN, ResNet etc.) may be trained to output angle $\hat{\gamma}$ using as input:

the DL and SL TX and RX samples at all RX beams i.e.:

- s(t), u(t)—TX signals in DL and SL respectively
- $y^{(j)}$, $z^{(j)}$, ∀j=1:j—RX signals in DL and SL respectively, at each RX beam j.

The time difference between the reception of the DL t1 and SL t2 i.e.:

$$t_1 - t_2.$$

The network may use a ReLu activation function and may be trained using the mean squared error between the estimated TD DL AOA and the true one. Other activation and/or cost functions may also be used.

To train the neural network, training data may be simulated as follows:

A DL RX RS may be generated for each RX beam using a one tap channel, where the distance between the gNB and the UE is drawn from the uniform distribution U[Dmin, Dmax] e.g. Dmin=1 m, Dmax=1 km; and A SL RX PRS may be generated for each UE RX beam using a one tap channel where the distance UE-TD may be drawn from a second uniform distribution U[dmin, dmax], e.g. dmin=0.1 m, dmax=300 m.

In at least some the embodiments described above, methods of positioning receive beam (e.g. combiner) selection for a low-capability device in which the device offloads the positioning reference signal measurements and receive beam selection to a paired high-capability device (e.g. a UE) are described. The RX beam selection for the low-capability device can therefore become a task for the high-capability device. The method may be extended to RX beam selection for data reception (e.g. cases in which the positioning reference signals may be replaced, for example, with power reference signals such as CSI-RS).

Figure 14:
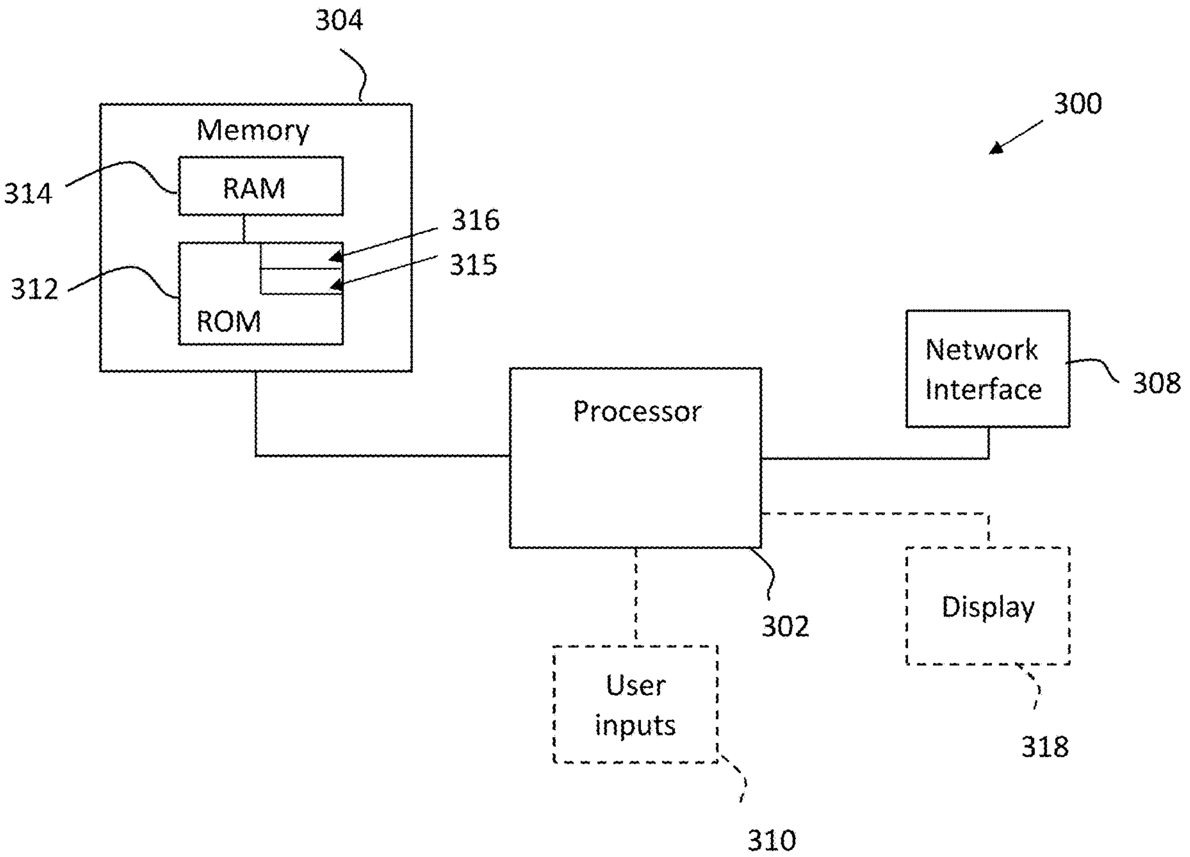
FIG. 14 is a schematic diagram of components of one or more of the example embodiments described previously.

For completeness, FIG. 14 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 50, 60, 80, 90, 120 and 130 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 15:
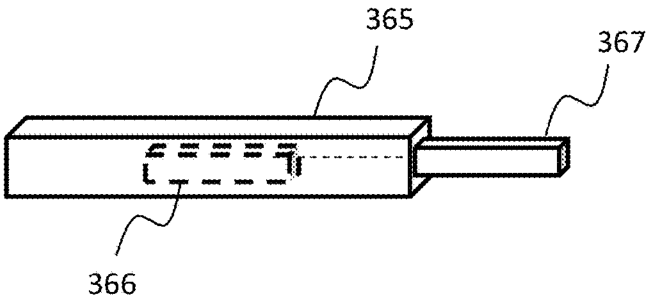
FIG. 15 shows tangible media for storing computer-readable code which when run by a computer may perform methods according to example embodiments described herein.

FIG. 15 shows a tangible media, in the form of a removable memory unit 365, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. Of course, other forms of tangible storage media may be used, as will be readily apparent to those of ordinary skilled in the art. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and sequences of FIGS. 5, 6, 8, 9, 12 and 13 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:

at least one processor; and at least one memory storing instructions that, when executed by the at least one processor, causes the apparatus to perform;

receiving a downlink reference signal for each of a plurality of angles of arrival of a first device, wherein the downlink reference signal is received at the first device from a network node at a first time;

receiving a sidelink reference signal, wherein the sidelink reference signal is received at the first device from a second device at a second time; and determining a downlink angle of arrival at the second device for use in communication between the second device and the network node, based, at least in part, on:

an estimated best angle for receiving the downlink reference signal, according to a metric, which includes the best angle representing a strongest beam or having a shortest delay, of the plurality of angles of arrival at the first device; and a position and orientation of the second device relative to the first device, based, at least in part, on the received sidelink reference signal.

2. An apparatus as claimed in claim 1, wherein the at least one processor; and the at least one memory storing instructions that, when executed by the at least one processor, further causes the apparatus to perform estimating the best angle for receiving the downlink reference signal, according to said metric, of the plurality of angles of arrival at the first device.

3. An apparatus as claimed in claim 1, wherein the at least one processor; and the at least one memory storing instructions that, when executed by the at least one processor, further causes the apparatus to perform providing the determined downlink angle of arrival at the second device to said second device.

4. An apparatus as claimed in claim 1, wherein the at least one processor; and the at least one memory storing instructions that, when executed by the at least one processor, further causes the apparatus to perform estimating the position and orientation of the second device relative to the first device based, at least in part, on the received sidelink reference signal.

5. An apparatus as claimed in claim 1, wherein the at least one processor; and the at least one memory storing instructions that, when executed by the at least one processor, further causes the apparatus to perform determining a geometry of a system comprising the first and second devices and said network node, wherein said geometry includes said downlink angle of arrival at the second device.

6. An apparatus as claimed in claim 5, wherein the determining said geometry comprises estimating a distance between the second device and the network node.

7. An apparatus as claimed in claim 1, wherein the sidelink reference signal is received at some or all of the plurality of angles of arrival of the first device.

8. An apparatus as claimed in claim 1, wherein the at least one processor; and the at least one memory storing instructions that, when executed by the at least one processor, further causes the apparatus to perform determining whether a difference between the first and second times exceeds a threshold.

9. An apparatus as claimed in claim 8, wherein the downlink angle of arrival at the second device is not provided to the second device in the event that the difference between the first and second times exceeds said threshold.

10. An apparatus as claimed in claim 8, wherein the at least one processor; and the at least one memory storing instructions that, when executed by the at least one processor, further causes the apparatus to perform determining said threshold.

11. An apparatus as claimed in claim 1, wherein the downlink reference signal is a positioning reference signal.

12. A second device comprising:

at least one processor; and at least one memory storing instructions that, when executed by the at least one processor, cause the apparatus to perform;

transmitting a sidelink reference signal to a first device; and receiving a downlink angle of arrival for use by the second device, from the first device, wherein the downlink angle of arrival for use by the second device is determined by the first device for use in communication between the second device and a network node, based, at least in part, on an estimated best angle for receiving a downlink reference signal, according to a metric, which includes the best angle representing a strongest beam or having a shortest delay, of a plurality of angles of arrival for receiving the downlink reference signal at the first device and a position and orientation of the second device relative to the first device, based, at least in part, on the transmitted sidelink reference signal.

13. A system comprising a first device and a second device, wherein:

the first device comprises at least one processor; and at least one memory storing instructions that, when executed by the at least one processor, causes the first device to perform:

receiving a downlink reference signal for each of a plurality of receiver angles of arrival of the first device, wherein the downlink reference signal is received at the first device from a network node at a first time;

receiving a sidelink reference signal, wherein the sidelink reference signal is received at the first device from the second device at a second time;

determining a downlink angle of arrival at the second device for use in communication between the second device and the network node, based, at least in part, on an estimated best angle for receiving the downlink reference signal, according to a metric, which includes the best angle representing a strongest beam or having a shortest delay, of the plurality of angles of arrival at the first device and a position and orientation of the second device relative to the first device, based, at least in part, on the received sidelink reference signal; and providing the determined downlink angle of arrival at the second device to said second device; and the second device comprises:

at least one processor; and at least one memory storing instructions that, when executed by the at least one processor, causes the second device to perform:

transmitting the sidelink reference signal to the first device; and receiving the determined downlink angle of arrival from the first device.

14. A method comprising:

receiving a downlink reference signal for each of a plurality of receiver angles of arrival of a first device, wherein the downlink reference signal is received at the first device from a network node at a first time;

receiving a sidelink reference signal, wherein the sidelink reference signal is received at the first device from a second device at a second time; and determining a downlink angle of arrival at the second device for use in communication between the second device and the network node, based, at least in part, on:

an estimated best angle for receiving the downlink reference signal, according to a metric, which includes the best angle representing a strongest beam or having a shortest delay, of the plurality of angles of arrival at the first device; and a position and orientation of the second device relative to the first device, based, at least in part, on the received sidelink reference signal.

* * * * *